(12) United States Patent
Yang et al.

(10) Patent No.: US 9,551,977 B2
(45) Date of Patent: Jan. 24, 2017

(54) HOUSING AND WEARABLE ELECTRONIC DEVICE USING THE SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Yi Yang, Shenzhen (CN); Ya-Jiao Wang, Shenzhen (CN); Xu Liu, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/689,604

(22) Filed: Apr. 17, 2015

(65) Prior Publication Data

US 2016/0183390 A1  Jun. 23, 2016

(30) Foreign Application Priority Data

Dec. 23, 2014  (CN) .......................... 2014 1 0807401

(51) Int. Cl.
*G06F 1/16*  (2006.01)
*G04B 37/08*  (2006.01)

(52) U.S. Cl.
CPC ............... *G04B 37/08* (2013.01); *G06F 1/163* (2013.01)

(58) Field of Classification Search
CPC ........ H05K 5/0017; H05K 5/061; H05K 5/00; H05K 5/0086; G06F 1/163; G06F 1/16; G06F 1/1601; G06F 1/1622; G06F 1/1626

USPC .............. 361/679.01, 679.02, 679.03, 679.3, 361/679.56; 368/281, 282
See application file for complete search history.

(56) References Cited

U.S. PATENT DOCUMENTS

| | | | | |
|---|---|---|---|---|
| 7,575,366 B2* | 8/2009 | Cretin | ..................... | G04B 3/048 368/187 |
| 7,628,530 B2* | 12/2009 | Andren | .............. | G04B 37/1486 224/177 |
| 2008/0049560 A1* | 2/2008 | Clarkson | ............ | G04B 37/1486 368/281 |
| 2010/0112949 A1* | 5/2010 | Kim | ................... | H01R 13/2421 455/41.3 |
| 2010/0112964 A1* | 5/2010 | Yi | .......................... | G04G 21/04 455/90.3 |
| 2011/0007468 A1* | 1/2011 | Burton | .................... | G04F 10/00 361/679.03 |
| 2012/0069716 A1* | 3/2012 | Peng | ...................... | G04G 21/04 368/10 |
| 2012/0092822 A1* | 4/2012 | Mooring | ................ | G04G 17/04 361/679.21 |
| 2015/0077912 A1* | 3/2015 | Ishibashi | ............. | H01M 2/1066 361/679.03 |

(Continued)

*Primary Examiner* — Courtney Smith
*Assistant Examiner* — Sagar Shrestha
(74) *Attorney, Agent, or Firm* — Zhigang Ma

(57) ABSTRACT

A shock and water resistant housing for a wearable device includes a first housing and a second housing assembled with the first housing, the first housing includes a first sleeve and a second sleeve contained in the first sleeve and the second housing includes a cover and a sealing ring embedded and fixed in the cover. The sealing ring is disposed on a junction of the first housing and the second housing for sealing the first housing and the second housing. A wearable electronic device using the housing is also provided.

12 Claims, 5 Drawing Sheets

(56) References Cited

U.S. PATENT DOCUMENTS

2015/0346767 A1\* 12/2015 Yang .................... G06F 1/1637
361/679.03

\* cited by examiner

HOUSING AND WEARABLE ELECTRONIC DEVICE USING THE SAME

FIELD

The subject matter herein generally relates to protective casings for an electronic device.

BACKGROUND

Wearable electronic devices such as watches are becoming more and more ubiquitous. However, such electronic devices are easily damaged by shock or ingress of water.

BRIEF DESCRIPTION OF THE DRAWINGS

Implementations of the present technology will now be described, by way of example only, with reference to the attached figures.

DETAILED DESCRIPTION

Figure 1:
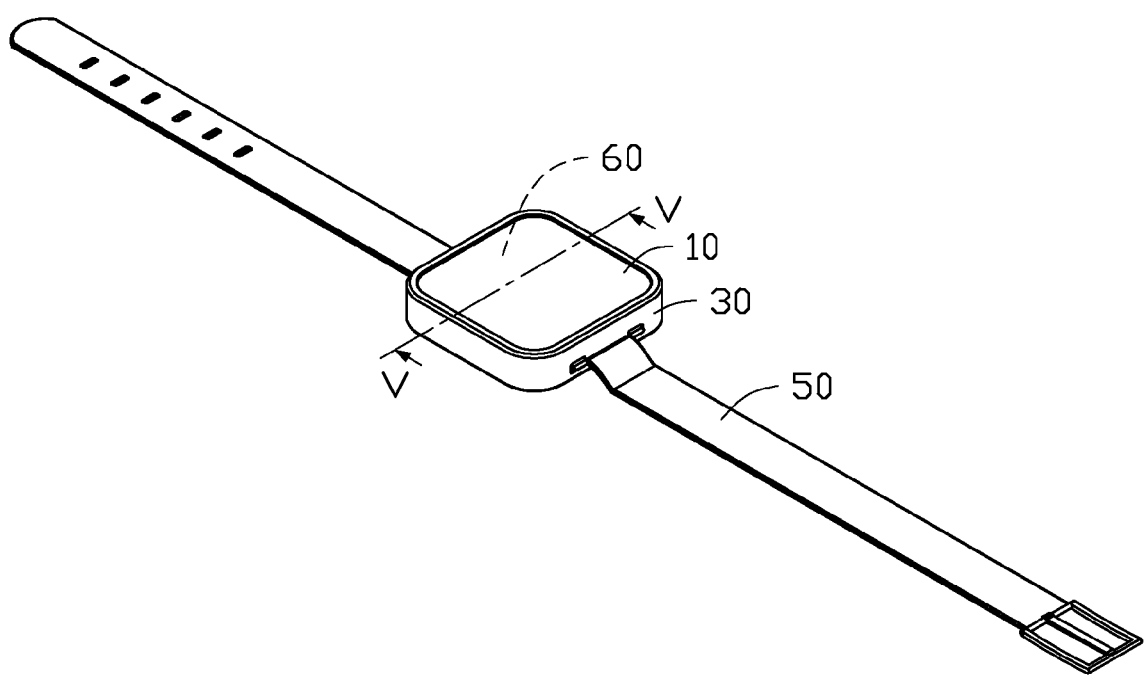
FIG. 1 is an assembled, isometric view of a wearable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact in relation to that feature. The term "comprising" when utilized, means "including, but not necessarily limited to"; it specifically indicates open-ended inclusion or membership in the so-described combination, group, series and the like.

FIG. 1 illustrates a wearable electronic device 100, which can be but is not limited to being, a watch. In one embodiment, the wearable electronic device 100 is a watch. The wearable electronic device 100 includes a display member 10 made of transparent materials, such as glass, a housing 30 and a connection member 50. The display member 10 is attached to the housing 30 in a sealed state so as to cover an upper-face opening of the housing 30. The display member 10 and the housing 30 cooperatively form an accommodation chamber 60 used to accommodate structures, and/or electronic components and modules for implementing preset functions. The connection member 50 is rotatably connected to two sides of the housing 30.

Figure 2:
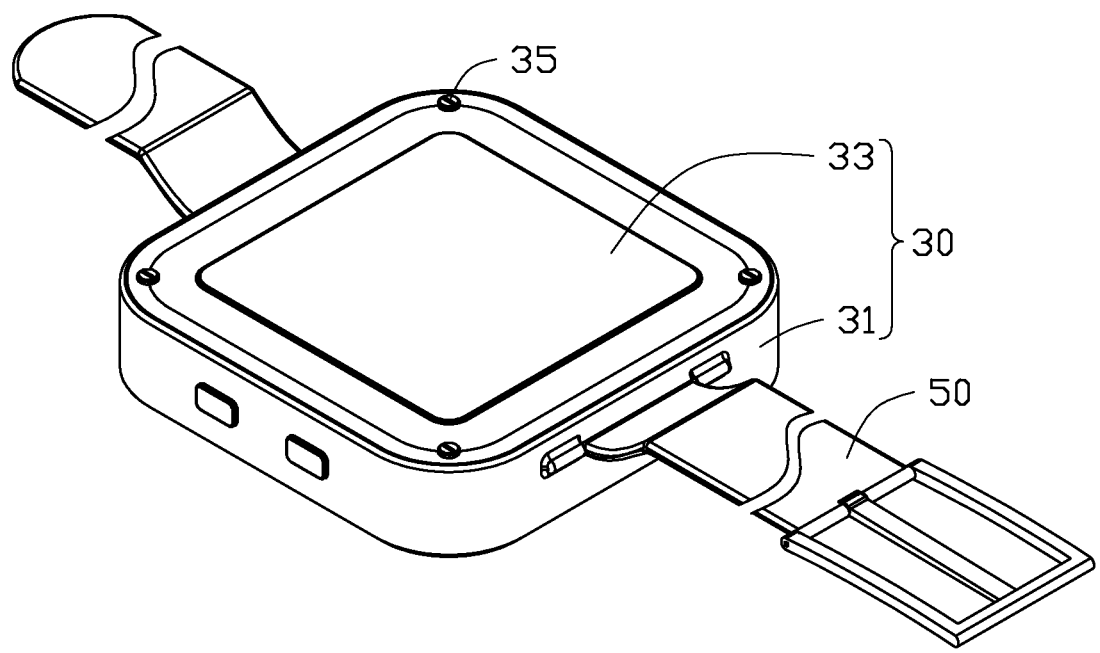
FIG. 2 is another assembled, isometric view of the wearable electronic device of FIG. 1.

Referring to FIG. 2, the housing 30 includes a first housing 31 and a second housing 33. The second housing 33 is attached to the first housing 31 in a sealed state so as to cover a lower-face opening of the first housing 31. The second housing 33 is assembled with the first housing 31 by connecting structures 35 such as screws.

Figure 3:
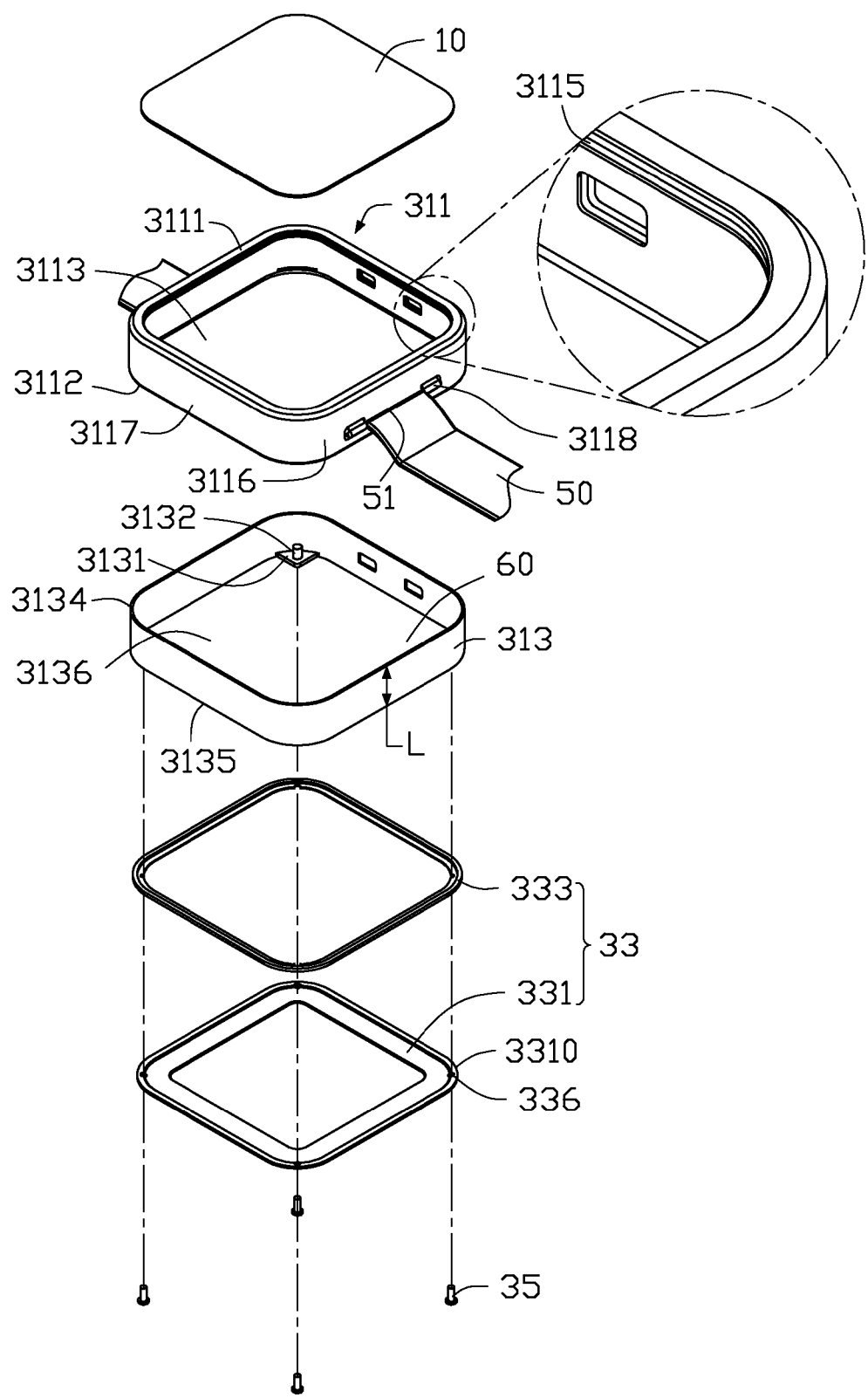
FIG. 3 is an exploded, isometric view of the wearable electronic device of FIG. 1.
Figure 4:
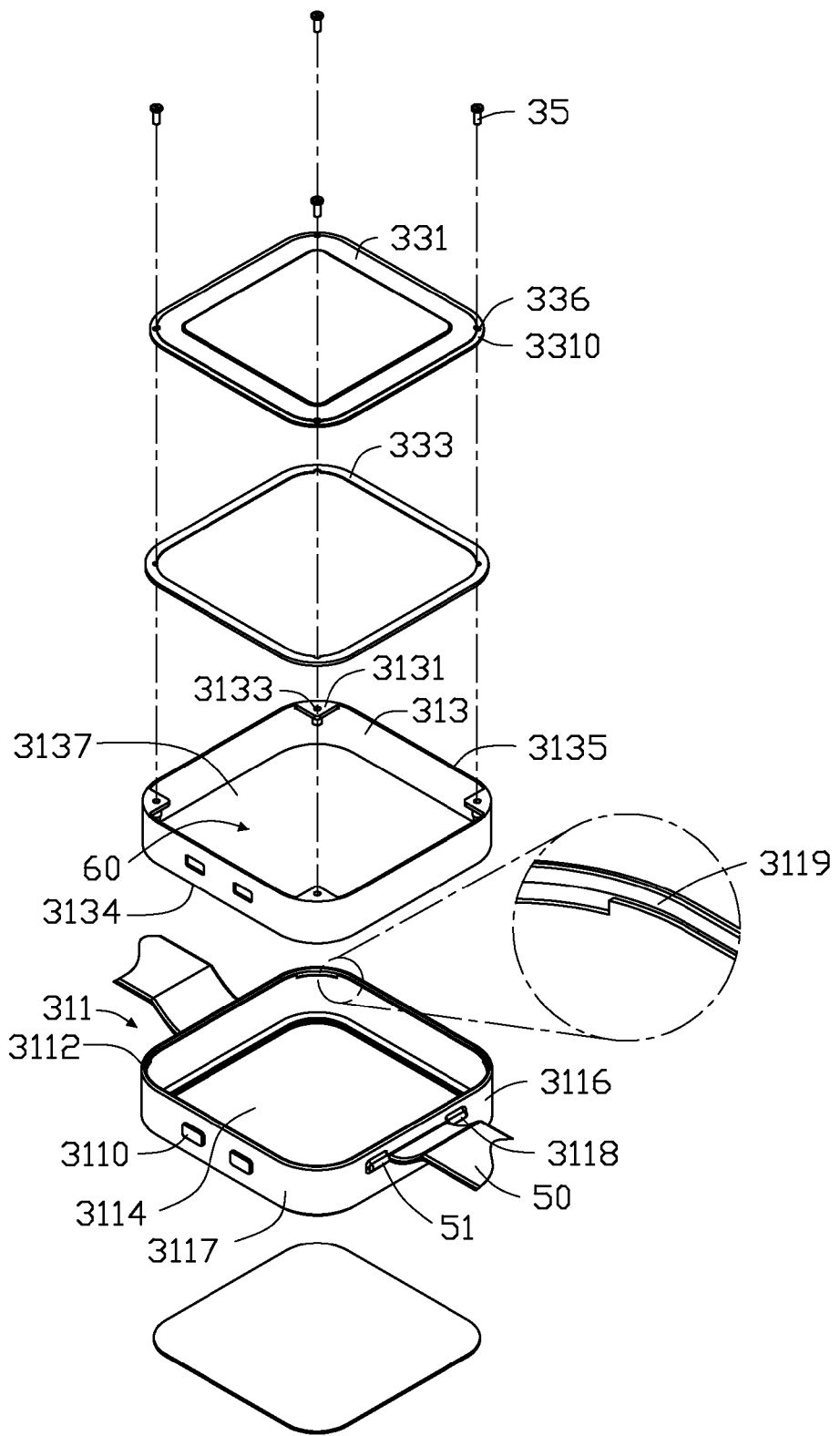
FIG. 4 is another exploded, isometric view of the wearable electronic device of FIG. 1.

Referring to FIG. 3 and FIG. 4, the first housing 31 includes a first sleeve 311 and a second sleeve encircling the first sleeve 313. The first sleeve 311 is made of elastic material so as to prevent the housing 30 of the wearable electronic device 100 from being damaged by shock or impact. The elastic materials can be thermoplastic polyurethane elastomers. The shape of the first sleeve 311 can be changed according to the desired shape of the wearable electronic device 100. In one embodiment, the first sleeve 311 has a substantially square configuration and includes a first end 3111 and a second end 3112 opposite to the first end 3111. The first sleeve end 3111 defines a first end opening 3113 and the second end 3112 defines a second end opening 3114. The first end 311 defines a first clamping slot 3115 to receive the watch display member. The first clamping slot 3115 is annular, and recessed from an inner side of the first end 3111. The second end 3112 defines a second clamping slot 3119 to accommodate the second sleeve 313. The second clamping slot 3119 is annular, and is recessed from the second end 3112 and extends into the first sleeve 31, towards the first end 311. The first sleeve 311 further includes two opposite first side surfaces 3116 and two opposite second side surfaces 3117 connected to the two first side surfaces 3116. Each first side surface 3116 forms a connection portion 3118 to connect to the connection member 50. One of the two second side surface 3117 defines at least one clamping slot 3110. The wearable electronic device 100 can thus be operated, e.g., activated, by pressing the clamping slot 3110.

Figure 5:
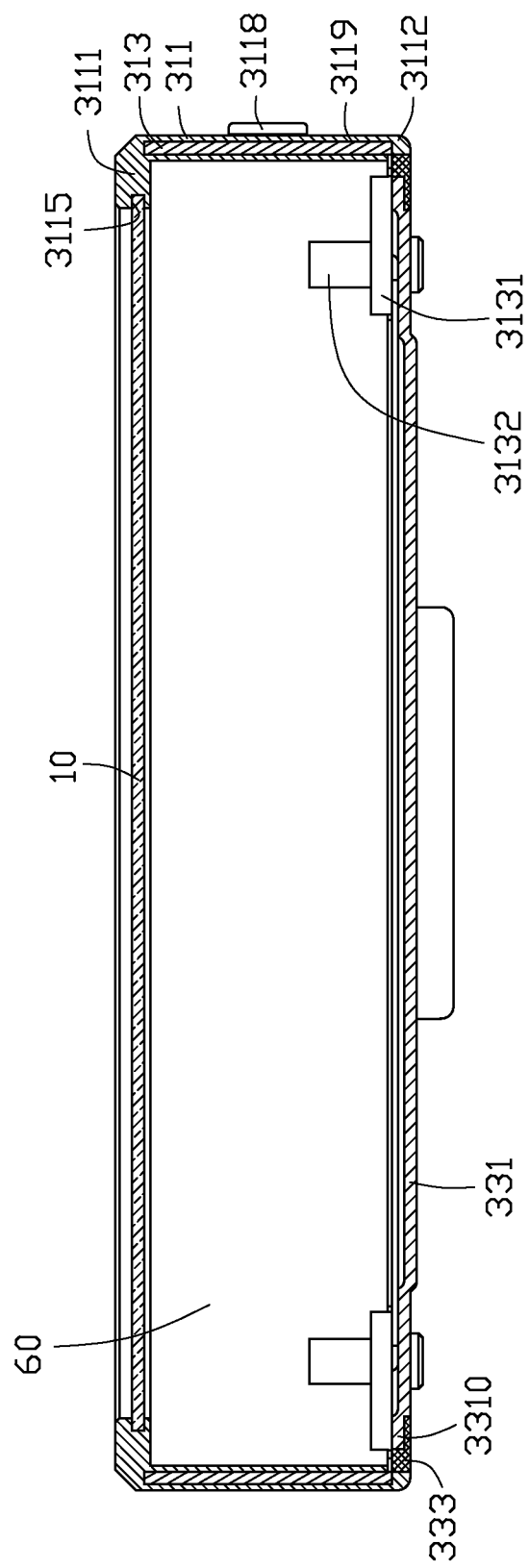
FIG. 5 is a cross sectional, isometric view along a line V-V of FIG. 1.

The second sleeve 313 defines a plurality of bearing members 3131 extending towards the accommodation chamber 60. The bearing members 3131 are configured to fix the first housing 31 on the second housing 33 by screws 35. In at least one embodiment, each bearing member 3131 defines a fixed pillar 3132 having a fixed hole 3133 engaged by the screw 25. Referring to FIG. 5, a width of the second sleeve 313 is equal to a depth of the second clamping slot 3119, thus the second sleeve 313 is accommodated in the second clamping slot 3119 of the first sleeve 311 and the bearing members 3131 are exposed from the first sleeve 311. The second sleeve 313 further defines a first portion 3134 and a second portion 3135 opposite to the first portion 3114. The first portion 3134 defines a first portion opening 3136 corresponding to the first end opening 3113, and the second portion 3135 defines a second portion opening 3137 corresponding to the second end opening 3114.

The second housing 33 includes a cover 331 and a sealing ring 333 embedded in the cover 331. In at least one embodiment, the cover 331 is made of metal and forms a connection portion 3310 having an annular shape for firmly securing the cover 331 and the sealing ring 333. The sealing ring 333 surrounds and wraps the connection portion 3310. The sealing ring 333 is made of rubber or rubber-like materials, such as thermoplastic polyurethane elastomers. It is to be understood that the second housing 33 defines a plurality of mounting holes 336 aligned with the fixed holes 3133, to accommodate a screw 35 to fix the first housing 33 on the second housing 31.

Each connection member 50 includes a connection pole 51, and each connection pole 51 is rotatably inserted into each connection portion 3118 to allow the connection member 51 to be rotatably connected to the housing 30. In at least one embodiment, the connection member 50 can be pliable, such like a watchband. It is to be understood that, the connection member 50 can be other connection members to attach to arms or clothes of users.

In assembly, the first sleeve 311 is fixed and embedded on the second sleeve 313 and the display member 10. Peripheral edges of the display member 10 are accommodated in the first clamping slot 3115 and the second sleeve 313 is accommodated in the second clamping slot 3119. The display member 10, the first sleeve 311, and the second sleeve 313 are thus connected together to form the first housing 31. The sealing ring 333 is attached to the second end 3112 of the first sleeve 311 and the second portion 3135 of the second sleeve 313. The cover 331 is coupled to the second sleeve 313 and substantially covers the second end opening 3114 and the second portion opening 3137. The second housing 33 is connected to the second end 3112 of the first housing 31, and the sealing ring 333 is disposed between the first housing 31 and the second housing 33 to create a seal between the first housing 31 and the second housing 33. The mounting holes 336 are aligned with the fixed holes 3133, and the screws 35 are inserted through the mounting holes 336 and the fixed holes 3133, to fix the first housing 31 on the second housing 33. The connection member 50 is connected to the connection portions 3118.

In summary, the first sleeve 311 connects to the display member 10 and the second sleeve 313, and the first sleeve 311 is embedded in the second sleeve 313 to prevent the wearable electronic device 100 and the electronic components from being damaged. The peripheral edges of the display member 10 are latched in the first sleeve 311 to seamlessly connect the display member 10 and the first housing 31. The sealing ring 333 is disposed in the space at the junction of the first housing 31 and the second housing 33 to form a seal in the wearable electronic device 100, preventing dust and water from entering into the wearable electronic device 100, thereby protecting the wearable electronic device 100.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A housing comprising:
    a first housing comprising:
        a first sleeve defining a first end and a second end opposite to the first end, the first end having a first end opening, the second end having a second end opening, the first end defining a first clamping slot, the second end defining a second clamping slot;
        a second sleeve substantially encircling the first sleeve, the second sleeve having a first portion and a second portion opposite to the first portion, the first portion having a first portion opening corresponding to the first end opening, the second portion having a second portion opening corresponding to the second end opening;
    a second housing comprising:
        a sealing ring attached to the second end of the first sleeve and the second portion of the second sleeve; and
        a cover coupled to the second sleeve and substantially covering the second end opening and the second portion opening;
    wherein a width of the second sleeve is equal to a depth of the second clamping slot, the second sleeve is latched in the second clamping slot.

2. The housing of claim 1, wherein the cover forms a connection portion surrounded and wrapped by the sealing ring.

3. The housing of claim 1, wherein the first sleeve and the sealing ring are made of thermoplastic polyurethane elastomers.

4. The housing of claim 1, wherein the second sleeve is made of metal.

5. The housing of claim 1, wherein the second sleeve forms a plurality of bearing members, each bearing member defines a fixed pillar having a fixed hole, the second housing defines a plurality of mounting holes aligned with the fixed holes.

6. A wearable electronic device comprising:
    a housing comprising:
        a first housing comprising:
            a first sleeve defining a first end and a second end opposite to the first end, the first end having a first end opening, the second end having a second end opening, the first end defining a first clamping slot, the second end defining a second clamping slot;
            a second sleeve substantially encircling the first sleeve, the second sleeve having a first portion and a second portion opposite to the first portion, the first portion having a first portion opening corresponding to the first end opening, the second portion having a second portion opening corresponding to the second end opening;
        a second housing comprising:
            a sealing ring attached to the second end of the first sleeve and the second portion of the second sleeve; and
            a cover coupled to the second sleeve and substantially covering the second end opening and the second portion opening
    a display member embedded and fixed in the first housing; and
    a connection member rotatably connected to the first housing;
    wherein a width of the second sleeve is equal to a depth of the second clamping slot, the second sleeve is latched in the second clamping slot.

7. The wearable electronic device of claim 6, wherein the first sleeve comprises two opposite first side surfaces and two opposite second side surfaces connected to the two first side surfaces, each first side surface forms a connection portion to connect to the connection member.

8. The wearable electronic device of claim 7, wherein each side of the connection member includes a connection pole rotatably connected into each connection portion.

9. The wearable electronic device of claim 6, wherein the cover forms a connection portion surrounded and wrapped by the sealing ring.

10. The wearable electronic device of claim 6, wherein the first sleeve and the sealing ring are made of thermoplastic polyurethane elastomers.

11. The wearable electronic device of claim 6, wherein the second sleeve is made of metal.

12. The wearable electronic device of claim 6, wherein the second housing defines a plurality of bearing members, each bearing member defines a fixed pillar having a fixed hole, the second housing defines a plurality of mounting holes aligned with the fixed holes.

\* \* \* \* \*